United States Patent
Hata et al.

(10) Patent No.: US 9,174,607 B2
(45) Date of Patent: Nov. 3, 2015

(54) WEBBING TAKE-UP DEVICE

(71) Applicant: KABUSHIKI KAISHA TOKAI-RIKA-DENKI-SEISAKUSHO, Aichi-ken (JP)

(72) Inventors: Yasunori Hata, Aichi (JP); Takashi Yoshida, Aichi (JP); Akira Sumiyashiki, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 166 days.

(21) Appl. No.: 13/945,198

(22) Filed: Jul. 18, 2013

(65) Prior Publication Data

US 2014/0021282 A1    Jan. 23, 2014

(30) Foreign Application Priority Data

Jul. 20, 2012 (JP) ................. 2012-161819

(51) Int. Cl.
   *B60R 22/40*    (2006.01)

(52) U.S. Cl.
   CPC ........... *B60R 22/40* (2013.01); *B60R 2022/402* (2013.01); *B60R 2022/403* (2013.01)

(58) Field of Classification Search
   CPC ............. B60R 22/40; B60R 21/01548; B60R 2022/402
   USPC .................... 242/384, 384.5, 384.6
   See application file for complete search history.

(56) References Cited

U.S. PATENT DOCUMENTS

| | | | |
|---|---|---|---|
| 4,401,282 A * | 8/1983 | Miki | 242/384.2 |
| 5,882,084 A * | 3/1999 | Verellen et al. | 297/478 |
| 6,164,581 A * | 12/2000 | Freeman et al. | 242/384.4 |
| 2010/0301153 A1* | 12/2010 | Lee et al. | 242/384 |

FOREIGN PATENT DOCUMENTS

| | | |
|---|---|---|
| EP | 1102070 | 5/2001 |
| JP | S58-148312 | 10/1983 |
| JP | 2009-262723 A | 11/2009 |
| JP | 2014-005863 | 1/2014 |

OTHER PUBLICATIONS

Extended European Search Report Application No. 13176999.4-1503 mailed Nov. 27, 2013.
JP Office Action issued in JP Application No. 2012-161819 dated Apr. 14, 2015 and English translation of notice of reasons for rejection.

* cited by examiner

*Primary Examiner* — Sang Kim
(74) *Attorney, Agent, or Firm* — Roberts Mlotkowski Safran & Cole, PC

(57) ABSTRACT

A shaft portion formed at a vertical wall of a sensor housing is formed in a circular column shape, and an abut portion is formed facing a support wall, below the shaft portion. A width dimension of the abut portion is the same as the diameter dimension of the shaft portion as seen in plan view, and the abut portion is formed so as to overlap entirely with the shaft portion as seen from the opposite side of the shaft portion to the abut portion. Foreign objects such as dirt or dust that fall onto the circular column shaped shaft portion therefore readily slide over the shaft portion and fall down from the shaft portion, and foreign objects such as dirt or dust do not stay on the abut portion.

4 Claims, 6 Drawing Sheets

WEBBING TAKE-UP DEVICE

CROSS-REFERENCE TO RELATED APPLICATION

This application claims priority under 35 USC 119 from Japanese Patent Application No. 2012-161819 filed Jul. 20, 2012, the disclosure of which is incorporated by reference herein.

BACKGROUND OF THE INVENTION

1. Field of the Invention

The present invention relates to a webbing take-up device configuring a vehicle seat belt apparatus, and in particular relates to a webbing take-up device suited to installing in a seat back of a vehicle mounted seat with reclining mechanism.

2. Related Art

In a webbing take-up device installed in the seat back of a seat with a reclining mechanism, the webbing take-up device tilts together with the seat back. This type of webbing take-up device is provided with a lock mechanism to detect acceleration in event of a sudden vehicle deceleration and to restrict rotation of a spool in a pull-out direction. A housing, in which is placed a spherical body that moves under inertia in the event of a sudden vehicle deceleration, is attached to a device main body of the webbing take-up device so as to be capable of rotating relative thereto, the housing rotating with respect to the device main body when the device main body is tilted, in an attempt to maintain the same attitude as prior to tilting of the device main body. The acceleration sensor accordingly functions similarly both before tilting of the device main body of the webbing take-up device, and when the device main body has tilted (see for example Japanese Patent Application Laid-Open (JP-A) No. 2009-262723).

As described above, the housing of the acceleration sensor is supported so as to be capable of rotating with respect to the device main body of the webbing take-up device, it is preferable that for example dirt and dust do not accumulate on a rotating shaft portion.

SUMMARY OF THE INVENTION

In consideration of the above circumstances, the present invention is to obtain a webbing take-up device wherein foreign objects such as dirt and dust do not readily accumulate on a shaft portion, on which an acceleration detection section rotates with respect to a device main body.

A webbing take-up device according to a first aspect of the present invention includes: a device main body comprising a spool, the spool taking up a webbing from a base end side thereof in a webbing length direction onto an outer peripheral portion of the spool by rotating in a take-up direction that is one direction about a center axis of the spool; an acceleration detection section that includes a placement face that is formed in a concave shape that is open upwards, a spherical shaped inertia mass body that is placed on the placement face, the inertia mass body rolling on the placement face due to inertia at a time of sudden vehicle deceleration, a shaft portion that penetrates a support portion provided at the device main body, and an abut portion that is formed at a lower side of the shaft portion and at a lateral side of the support portion in an axial direction of the shaft portion, and that restricts movement of the shaft portion along the axial direction by the support portion abutting the abut portion, the acceleration detection section rotating about the shaft portion with respect to the device main body accompanying tilting of the device main body such that the acceleration detection section maintains the same orientation as orientation of the acceleration detection section in a state prior to the device main body tilting; and a lock section that is actuated by the spool rotating in a pull-out direction that is an opposite direction from the take-up direction in a state in which the inertia mass body of the acceleration detection section rolls on the placement face, rotation of the spool in the pull-out direction being restricted by actuation of the lock section.

In the webbing take-up device of the first aspect, the inertia mass body of the acceleration detection section moves on the placement face under inertia in event of a sudden vehicle deceleration in a state in which the webbing has been pulled out from the spool of the device main body and is being worn by an occupant. In this state, when the body of the occupant, attempting to move under inertia towards the vehicle front, pulls on the webbing and rotates the spool in the pull-out direction, the lock section is actuated and rotation of the spool in the pull-out direction is restricted. The webbing is accordingly restricted from being pulled out from the spool, the webbing effectively restraining the body of the occupant that is attempting to move towards the vehicle front under inertia.

In the present webbing take-up device, when the device main body tilts accompanying tilting (reclining) of the vehicle seat back, the acceleration detection section rotates (swings) with respect to the device main body about the shaft portion of the acceleration detection section such that the acceleration detection section attempts to maintain its attitude prior to tilting of the device main body. There is accordingly no change to the attitude of the acceleration detection section, or any such change in attitude is small, even when the device main body tilts as described above. The acceleration detection section can accordingly be made to function similarly to prior to tilting, even when the device main body has tilted.

The abut portion is formed at the shaft portion of the acceleration detection section. The abut portion faces the support portion provided at the device main body along the shaft portion axial direction, and when the abut portion approaches the support portion together with the shaft portion along the shaft portion axial direction, the support portion abuts the abut portion. Movement of the shaft portion in the shaft portion axial direction, and therefore movement of the acceleration detection section, can accordingly be restricted.

Note that the abut portion is formed to the lower side of the shaft portion. Dirt and the like accordingly do not get caught in-between the abut portion and the support portion at the upper side of the shaft portion. Accordingly, dirt does not readily collect on the shaft portion, and dirt and the like can be prevented or effectively suppressed from entering between an inner peripheral portion of a hole or groove in the support portion through which the shaft portion passes and an outer peripheral portion of the shaft portion.

A webbing take-up device according to a second aspect of the present invention is the first aspect of the present invention wherein a width dimension of the abut portion is equal to or less than a diameter dimension of the shaft portion, and a shape of the abut portion is set such that the abut portion entirely overlaps with the shaft portion when the shaft portion is seen from a side of the shaft portion which side is opposite to the abut portion.

In the webbing take-up device of the second aspect, the width dimension of the abut portion is the diameter dimension of the shaft portion or less, and the shape of the abut portion is set such that the entire abut portion overlaps with the shaft portion as seen from the opposite side of the shaft portion to the abut portion. Dirt and the like that has slipped off the shaft portion can accordingly be prevented or effectively suppressed from accumulating on the abut portion. Dirt and the like can therefore be prevented or effectively suppressed from entering between an inner peripheral portion of a hole or groove in the support portion through which the shaft portion passes and an outer peripheral portion of the shaft portion.

A webbing take-up device according to a third aspect of the present invention is either the first aspect or the second aspect of the present invention wherein the abut portion is formed continuous to the shaft portion.

In the webbing take-up device of the third aspect, the abut portion is formed continuous (contiguous) to the shaft portion. There is accordingly no gap formed between the shaft portion and the abut portion. There is therefore no undercut portion, or any undercut portion is reduced, during molding. Manufacture is accordingly simplified.

As described above, in the webbing take-up device of the present invention, foreign objects such as dirt and dust do not readily accumulate on a shaft portion on which the acceleration detection section rotates with respect to the device main body.

BRIEF DESCRIPTION OF THE DRAWINGS

Embodiments of the invention will be described in detail with reference to the following figures, wherein.

DETAILED DESCRIPTION OF THE INVENTION

Present Exemplary Embodiment Configuration

Figure 1:
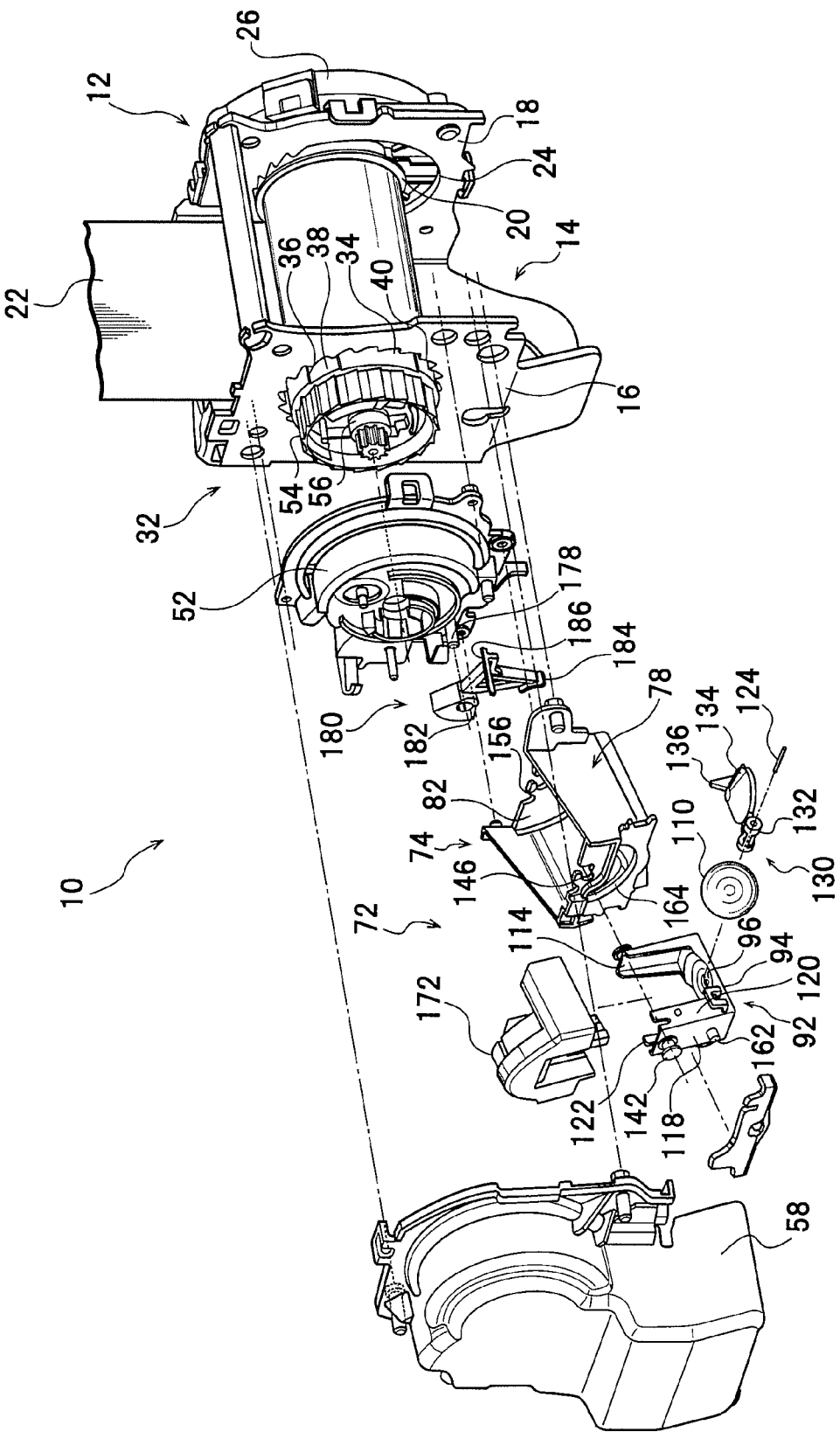
FIG. 1 is an exploded perspective view illustrating an overall configuration of a webbing take-up device according to an exemplary embodiment of the present invention.

FIG. 1 is a schematic exploded perspective view illustrating a schematic configuration of a webbing take-up device 10 according to an exemplary embodiment of the present invention. As illustrated in FIG. 1, the webbing take-up device 10 includes a device main body 12. The device main body 12 is provided with a frame 14. The frame 14 is provided inside a seat back configuring a vehicle seat, and is integrally fastened and fixed for example to a frame (seat back framework) of the seat back, by for example bolts.

The frame 14 includes a pair of leg plates 16 and 18. The leg plates 16 and 18 are respectively formed in plate shapes with thickness direction oriented along the seat back width direction, and face each other in the seat back width direction. A spool 20 is provided between the leg plate 16 and the leg plate 18. The spool 20 is configured as a hollow shaft member whose axial direction is oriented in the facing direction of the leg plate 16 and the leg plate 18.

A base end side in a length direction of a webbing 22 is anchored to the spool 20. The webbing 22 is formed in an elongated belt shape, with the webbing 22 width direction being along the spool 20 axial direction. The webbing 22 is taken up and stored on an outer peripheral portion of the spool 20 from the length direction base end side of the webbing 22 when the spool 20 rotates in a take-up direction that is one direction about the spool 20 axial center. When the leading end side of the webbing 22 is pulled, the webbing 22 that is taken up on the spool 20 is pulled out, and the spool 20 rotates in a pull-out direction that is the opposite direction to the take-up direction.

A spring case 26 is attached to the leg plate 18 at the outside of the leg plate 18 (on the opposite side of the leg plate 18 to the leg plate 16). A spiral spring serving as a spool biasing member is housed inside the spring case 26. A spiral direction outside end of the spiral spring is anchored to the spring case 26, and the spiral direction inside end of the spiral spring is directly or indirectly anchored to a leg plate 18 side end portion of the spool 20 that passes through the leg plate 18 and enters inside the spring case 26. When the spool 20 is rotated in the pull-out direction, the spiral spring is wound tighter and biases the spool 20 in the take-up direction.

A pawl housing portion 36 is formed to a leg plate 16 side portion of the spool 20 so to be open at the outer peripheral face of the spool 20. A lock pawl 38 is provided inside the pawl housing portion 36. The portion of the spool 20 at which the pawl housing portion 36 is formed penetrates a ratchet hole 40 formed in the leg plate 16, when a portion of the lock pawl 38 comes out from the pawl housing portion 36, a ratchet teeth formed at a leading end side of the lock pawl 38 mesh with ratchet teeth of the ratchet hole 40. Rotation of the spool 20 in the pull-out direction is accordingly restricted.

A sensor holder 52 is attached to the leg plate 16 at the leg plate 16 outside (on the opposite side of the leg plate 16 to the leg plate 18). The sensor holder 52 is formed in a bottomed shape such that a portion of the sensor holder 52 is open towards the leg plate 16 side, with a V gear 54 provided inside the sensor holder 52. A shaft portion 56 corresponding to the V gear 54 extends from the spool 20 towards the sensor holder 52 side. The shaft portion 56 is provided coaxially to the spool 20, and the V gear 54 is rotatably supported on the shaft portion 56.

The V gear 54 is provided with a spring, not shown in the drawings. A portion of this spring is engaged with the spool 20, and the spring is pressed against the spool 20 when the spool 20 rotates in the pull-out direction, and the spring pressing the V gear 54 in the pull-out direction. The V gear 54 can accordingly rotate in the pull-out direction following the spool 20. The spool 20 can rotate in the pull-out direction relative to the V gear 54 by resiliently deforming the spring. A portion of the lock pawl 38 is engaged with the V gear 54, meshes with the ratchet teeth of the ratchet hole 40 by the lock pawl 38 moving in the a direction of coming out from the pawl housing portion 36 interlockingly with the relative rotation of the spool 20 in the pull-out direction with respect to the V gear 54.

A sensor cover 58 is provided at the opposite side of the sensor holder 52 to the leg plate 16. The sensor cover 58 is configured in a bottomed shape open towards the leg plate 16 side, and is attached to the leg plate 16. An acceleration sensor 72 is provided inside the sensor cover 58. The acceleration sensor 72 includes a hanger 74. The hanger 74 is provided with a bottom wall 76, a peripheral wall 78 projects upwards from a peripheral edge of the bottom wall 76. The hanger 74 is accordingly formed with an overall box shape open towards the side opposite to the bottom wall 76. The bottom wall 76 of the hanger 74 is fixed to the leg plate 16 of the frame 14. The bottom wall 76 of the hanger 74 is provided with support walls 80 and 82. The support wall 80 and the support wall 82 are formed in plate shapes facing each other in the same direction as the spool 20 axial direction, or facing each other in a direction in which one side along the spool 20 axial direction is inclined with respect to the other side at a specific angle in the seat up-down direction.

Figure 2:
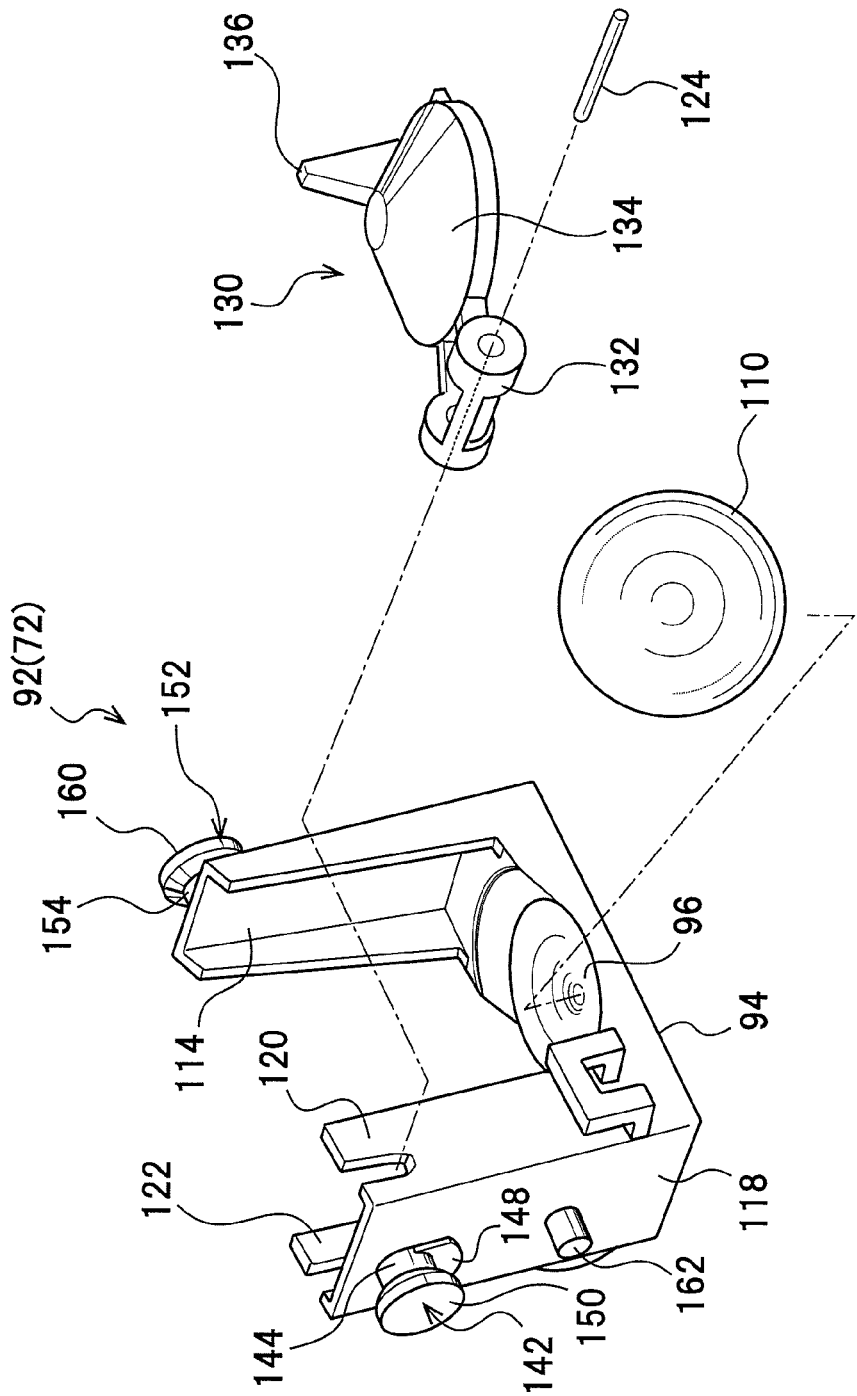
FIG. 2 is an enlarged exploded perspective view illustrating relevant portions of a webbing take-up device according to an exemplary embodiment of the present invention.

A sensor housing 92 serving as a housing formed for example by molding overall from a synthetic resin, is provided between the support wall 80 and the support wall 82 of the hanger 74. The sensor housing 92 is provided with a placement portion 94 as shown in FIG. 2. In the placement portion 94, a placement face 96 is formed. The placement face 96 is a circular cone shape opening upwards, and a sensor ball 110 serving as an inertia mass body is placed on the placement face 96.

A vertical wall 114 projects upwards from a support wall 82 side end portion of the placement portion 94, and a vertical wall 118 projects upwards from a support wall 80 side end portion of the placement portion 94. Lateral walls 120 and 122 extend from both width direction ends of the vertical wall 118 towards the vertical wall 114 side. A support shaft 124 is provided in the vicinity of upper end portions of the lateral walls 120 and 122. As illustrated in FIG. 1, the support shaft 124 is a shaft member whose axial direction is along the facing direction of the lateral wall 120 and the lateral wall 122. One end of the support shaft 124 is supported by the lateral wall 120 and the other end of the support shaft 124 is supported by the lateral wall 122.

A sensor lever 130 is provided between the lateral wall 120 and the lateral wall 122. As illustrated in FIG. 2, the sensor lever 130 includes a base portion 132. In the base portion 132, the support shaft 124 penetrates through. The sensor lever 130 is accordingly supported so as to be capable of rotating (swinging) about the support shaft 124. The sensor lever 130 includes a hat portion 134. The hat portion 134 is formed with a shallow circular conical shaped external appearance. The bottom face of the hat portion 134 is configured as a curved face or a sloping face with a concave shape that is open towards the opposite side to the circular cone apex portion of the hat portion 134. The bottom face of the hat portion 134 covers the sensor ball 110 that is placed on the placement face 96 of the placement portion 94.

The hat portion 134 rotates (swings) upwards about the support shaft 124 when the sensor ball 110 rises up on the placement face 96 towards an edge portion of the placement face 96. A pressing projection 136 is formed to the hat portion 134, so as to project substantially upwards (namely towards the opposite side to the bottom face of the hat portion 134), and the pressing projection 136 pushes upwards a V pawl 180, described later, when the hat portion 134 swings upwards about the support shaft 124.

Figure 4A:
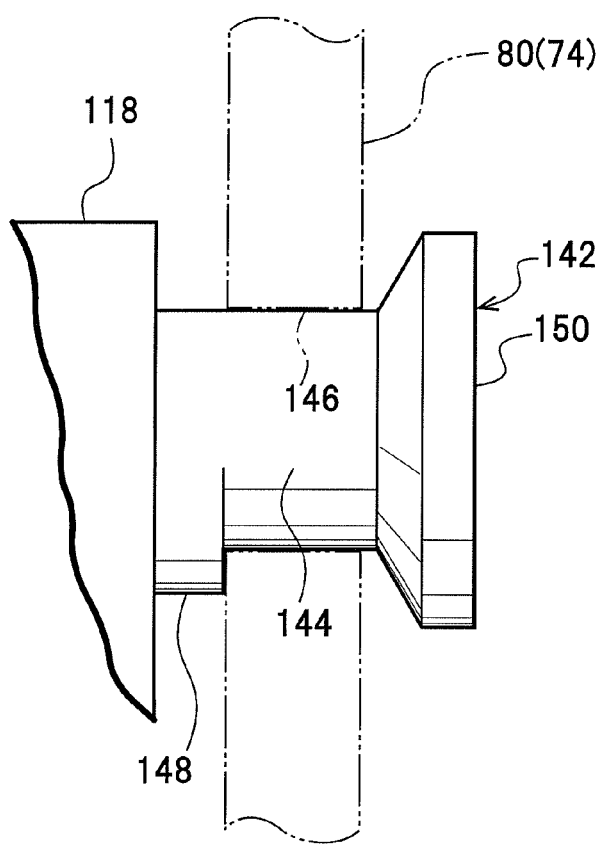
FIG. 4A is an enlarged front face view of a shaft portion and a restriction portion.
Figure 4B:
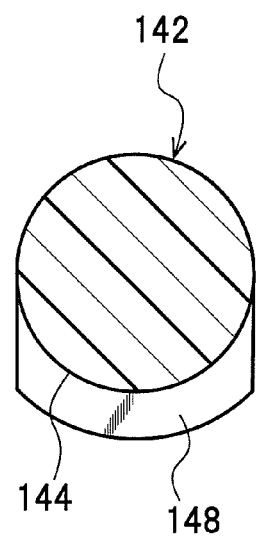
FIG. 4B is a side face cross-section of the shaft portion and the restriction portion.

A rotating shaft 142 is provided in the vicinity of an upper end portion of the vertical wall 118 described above, and is formed projecting from the face of the vertical wall 118 on the opposite side to the vertical wall 114. The rotating shaft 142 is provided with a shaft portion 144. As shown in FIGS. 4A and 4B, the shaft portion 144 is a circular cylinder (column) shape whose axial direction is along a facing direction of the vertical wall 114 and the vertical wall 118. A shaft receiving groove 146 is formed to the support wall 80 of the hanger 74, corresponding to the shaft portion 144.

The shaft receiving groove 146 penetrates the support wall 80 in the thickness direction of the support wall 80 and is open at an upper end portion of the support wall 80. The shaft receiving groove 146 is bent or curved into a substantially L-shape at an intermediate portion of the shaft receiving groove 146. The shaft portion 144 (the rotating shaft 142), that enters inside the shaft receiving groove 146 from the open end of the shaft receiving groove 146 at the upper end portion of the support wall 80, reaches the end portion of the shaft receiving groove 146 on the opposite side to the open end. The shaft portion 144 (the rotating shaft 142) is supported by the shaft receiving groove 146 so as to be capable of rotating (swinging) about its axial center.

An abut portion 148 is formed at the lower side of a shaft portion 144. The abut portion 148 is formed continuous to the shaft portion 144 by locally thickening of the vertical wall 118. The abut portion 148 faces the support wall 80 to the lateral side of the shaft receiving groove 146. When the sensor housing 92 attempts to move towards the support wall 80 side, the support wall 80 abuts (contacts) the abut portion 148, thereby restricting movement of the sensor housing 92 towards the support wall 80 side.

The width dimension (dimension in a direction orthogonal to the axial direction of the shaft portion 144 and to the vertical (up-down) direction) of the abut portion 148 in plan view (FIG. 4B) is equal to or less than, preferably, the same as the diameter dimension of the shaft portion 144, and the entire abut portion 148 overlaps with the shaft portion 144 as viewed from the opposite side of the shaft portion 144 to the abut portion 148.

A restriction portion 150 is formed at a leading end of the shaft portion 144, that projects out through the shaft receiving groove 146 to the hanger 74 outside. The restriction portion 150 is circular plate shaped with an external diameter dimension larger than the shaft portion 144, and is formed coaxially to the shaft portion 144. A portion of the restriction portion 150 further to the shaft portion 144 side than an axial direction intermediate portion is formed with a circular truncated conical profile or a tapered profile of gradually decreasing external diameter dimension on progression towards the shaft portion 144 side.

A shaft portion 144 side end portion of the restriction portion 150 is set with an external diameter dimension the same as the external diameter dimension of the shaft portion 144. The axial direction length of the shaft portion 144 and the form position of the restriction portion 150 are moreover set such that there is a separation from the shaft portion 144 side end portion of the restriction portion 150 to an outer face of the support wall 80 in an assembled state of the acceleration sensor 72 to the hanger 74 (in other words, such that the leading end of the shaft portion 144 projects to the outside of the support wall 80). The restriction portion 150 faces the support wall 80, and when the acceleration sensor 72 attempts to move towards the support wall 82 side, the support wall 80 contacts (abuts) the restriction portion 150, thereby restricting movement of the sensor housing 92 towards the support wall 82 side.

Figure 3:
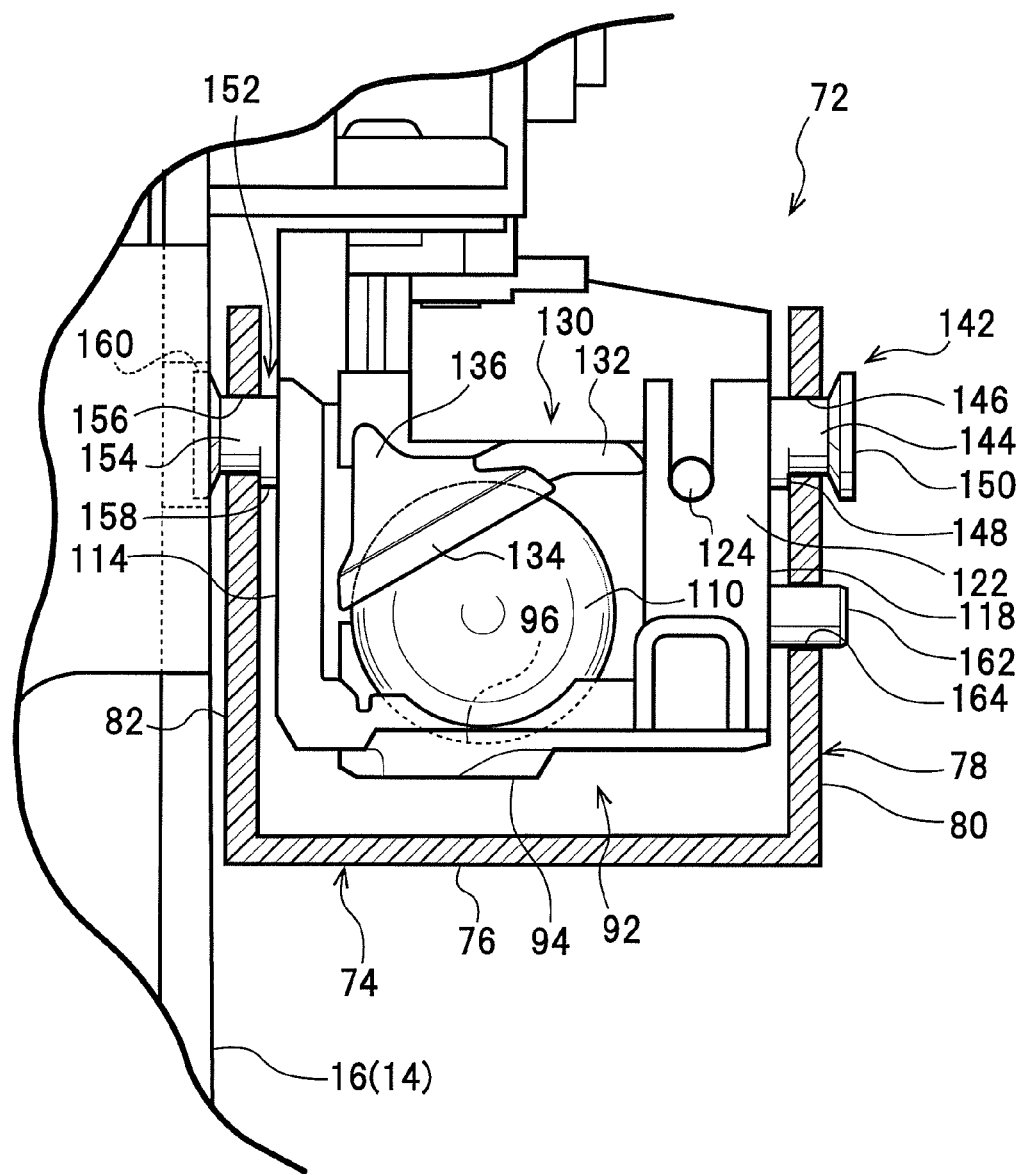
FIG. 3 is an enlarged front face cross-section of relevant portions of a webbing take-up device according to an exemplary embodiment of the present invention.

A rotating shaft 152 is formed in the vicinity of an upper end portion of the vertical wall 114 described above, and is formed projecting from the face of the vertical wall 114 on the opposite side to the vertical wall 118. As illustrated in FIG. 3, the rotating shaft 152 includes a shaft portion 154. The shaft portion 154 is a circular cylinder (column) shape and is formed coaxially to the shaft portion 144, with the shaft portion 154 axial direction being along the facing direction of the vertical wall 114 and the vertical wall 118. A shaft receiving groove 156 is formed to the support wall 82 of the hanger 74 corresponding to the shaft portion 154.

The shaft receiving groove 156 penetrates the support wall 82 in the thickness direction of the support wall 82, and is open at an upper end portion of the support wall 82. The shaft receiving groove 156 is bent or curved at an intermediate portion to form a substantially L-shape, and the shaft portion 154 (the rotating shaft 152) that enters inside the shaft receiving groove 156 from the open end of the shaft receiving groove 156 at the upper end portion of the support wall 82, reaches the end portion of the shaft receiving groove 156 on the opposite side to the open end. The shaft portion 154 (the rotating shaft 152) is supported by the shaft receiving groove 156 so as to be capable of rotating (swinging) about its axial center.

An abut portion 158 is formed at a lower side of the shaft portion 154. The abut portion 158 is formed continuous to the shaft portion 154 by locally thickening of the vertical wall 114. The abut portion 158 faces the support wall 82 to the lateral side of the shaft receiving groove 156. When the sensor housing 92 attempts to move towards the support wall 82 side, the support wall 82 abuts (contacts) the abut portion 158, thereby restricting movement of the sensor housing 92 towards the support wall 82 side.

The width dimension (dimension in a direction orthogonal to the axial direction of the shaft portion 154 and to the vertical (up-down) direction) of the abut portion 158 in plan view is equal to or less than, preferably, the same as the diameter dimension of the shaft portion 154, and the entire abut portion 158 overlaps with the shaft portion 154 as viewed from the opposite side of the shaft portion 154 to the abut portion 158.

A restriction portion 160 is formed at a leading end of the shaft portion 154 that projects out through the shaft receiving groove 156 to the hanger 74 outside. The restriction portion 160 is circular plate shaped with an external diameter dimension larger than that of the shaft portion 154, and is formed coaxially to the shaft portion 154. A portion of the restriction portion 160 further to the shaft portion 154 side than an axial direction intermediate portion is formed with a circular truncated conical profile or a tapered profile of gradually decreasing external diameter dimension on progression towards the shaft portion 154 side. A shaft portion 154 side end portion of the restriction portion 160 is set with an external diameter dimension the same as the external diameter dimension of the shaft portion 154.

The axial direction length of the shaft portion 154 and the form position of the restriction portion 160 are moreover set such that there is a separation from the shaft portion 154 side end portion of the restriction portion 160 to an outer face of the support wall 82 in an assembled state of the acceleration sensor 72 to the hanger 74 (in other words, such that the leading end of the shaft portion 154 projects to the outside of the support wall 82). The restriction portion 160 faces the support wall 82, and when the acceleration sensor 72 attempts to move towards the support wall 80 side, the support wall 82 abuts (contacts) the restriction portion 160, thereby restricting movement of the sensor housing 92 towards the support wall 80 side.

A guide pin 162 is formed projecting from the face of the vertical wall 118 on the opposite side to the vertical wall 114 at the lower side of the position where the rotating shaft 142 is formed to the vertical wall 118. The projection direction of the guide pin 162 from the vertical wall 118 is the same direction as the axial direction of the shaft portion 144 of the rotating shaft 142. The guide pin 162 enters inside a guide hole 164 formed in the support wall 80 of the hanger 74.

The guide hole 164 is configured as a curved elongated hole with curvature thereof centered on a specific position of the shaft receiving groove 146. The guide pin 162 enters inside the guide hole 164, thereby limiting the rotating (swinging) range of the sensor housing 92 about the rotating shaft 142 to between a position where the guide pin 162 abuts one length direction end of the guide hole 164 and a position where the guide pin 162 abuts the other length direction end of the guide hole 164.

A support shaft 178 is formed projecting from the sensor holder 52 towards the opposite side to the leg plate 16. The support shaft 178 axial direction is set as the same direction as the spool 20 axial direction, and a base portion 182 of the V pawl 180 is supported so as to be capable of rotating about the support shaft 178. The V pawl 180 is provided with a plate shaped pressure receiving plate 184. The pressure receiving plate 184 is positioned at the upper side of the pressing projection 136 of the sensor lever 130. The pressing projection 136 is set with a size such that, within the rotating range of the sensor housing 92 about the rotating shaft 142 between the abut state of the guide pin 162 with the one end of the guide hole 164 and the abut state of the guide pin 162 with the other end of the guide hole 164, the lower side face of the pressure receiving plate 184 faces the pressing projection 136.

The V pawl 180 is further provided with an engagement claw 186. An opening, not shown in the drawings, is formed at the sensor holder 52, corresponding to the engagement claw 186. A portion of the sensor holder 52 that houses the V gear 54 and the outside of the sensor holder 52 are in communication with each other through this opening. When the sensor lever 130 rotates upwards about the support shaft 124 and the pressing projection 136 presses the pressure receiving plate 184 upwards, the engagement claw 186 meshes with ratchet teeth formed to an outer peripheral portion of the V gear 54. Rotation of the V gear 54 in the pull-out direction is thereby restricted when the engagement claw 186 is meshed with the ratchet teeth of the V gear 54.

Operation and Advantageous Effects of Present Exemplary Embodiment

Explanation now follows regarding operation and advantageous effects of the present exemplary embodiment.

In the webbing take-up device 10, in event of sudden vehicle deceleration, the sensor ball 110 rolls across the placement face 96 formed at the placement portion 94 of the sensor housing 92 in the acceleration sensor 72, the sensor ball 110 rising up as it rolls towards an edge portion side of the placement face 96. The sensor ball 110 that has rolled as described above presses the bottom face of the hat portion 134 upwards, rotating the sensor lever 130 upwards about the support shaft 124.

The pressing projection 136 formed at the hat portion 134 pushes up the lower face of the pressure receiving plate 184 of the V pawl 180 when the sensor lever 130 rotates in this manner, thereby rotating (swinging) the V pawl 180 about the support shaft 178. When the V pawl 180 rotates in this manner, the engagement claw 186 accordingly moves upwards, meshing with the ratchet teeth formed to the outer peripheral portion of the V gear 54. Rotation of the V gear 54 in the pull-out direction is accordingly restricted.

The webbing 22 is pulled when the occupant wearing the webbing 22 moves under inertia towards the vehicle front due to sudden vehicle deceleration. The spool 20 rotates in the pull-out direction as the webbing 22 is pulled.

When the spool 20 rotates in the pull-out direction in a state in which relative rotation of the V gear 54 in the pull-out direction is restricted due to the engagement claw 186 of the V pawl 180 meshing with the ratchet teeth of the V gear 54, as described above, relative rotation of the spool 20 in the pull-out direction with respect to the V gear 54 occurs. When such relative rotation occurs between the V gear 54 and the spool 20, the lock pawl 38 moves such that a portion of the lock pawl 38 projects out from the pawl housing portion 36 that is formed at the spool 20, and ratchet teeth at the leading end side of the lock pawl 38 thereby meshes with the ratchet teeth of the ratchet hole 40 formed at the leg plate 16.

Rotation of the spool 20 in the pull-out direction is thus restricted due to the ratchet teeth of the lock pawl 38 meshing with the ratchet teeth of the ratchet hole 40. The webbing 22 is thereby restricted from being pulled out from the spool 20, the webbing 22 thereby effectively restraining the body of the occupant as it attempts to move under inertia towards the vehicle front.

Note that the webbing take-up device 10 is built into the seat back of the seat with reclining mechanism, as described above. When the seat back is reclined with respect to a seat cushion, the webbing take-up device 10 that is built into the seat back rotates (swings) about the reclining axis of the seat back and tilts.

Figure 5:
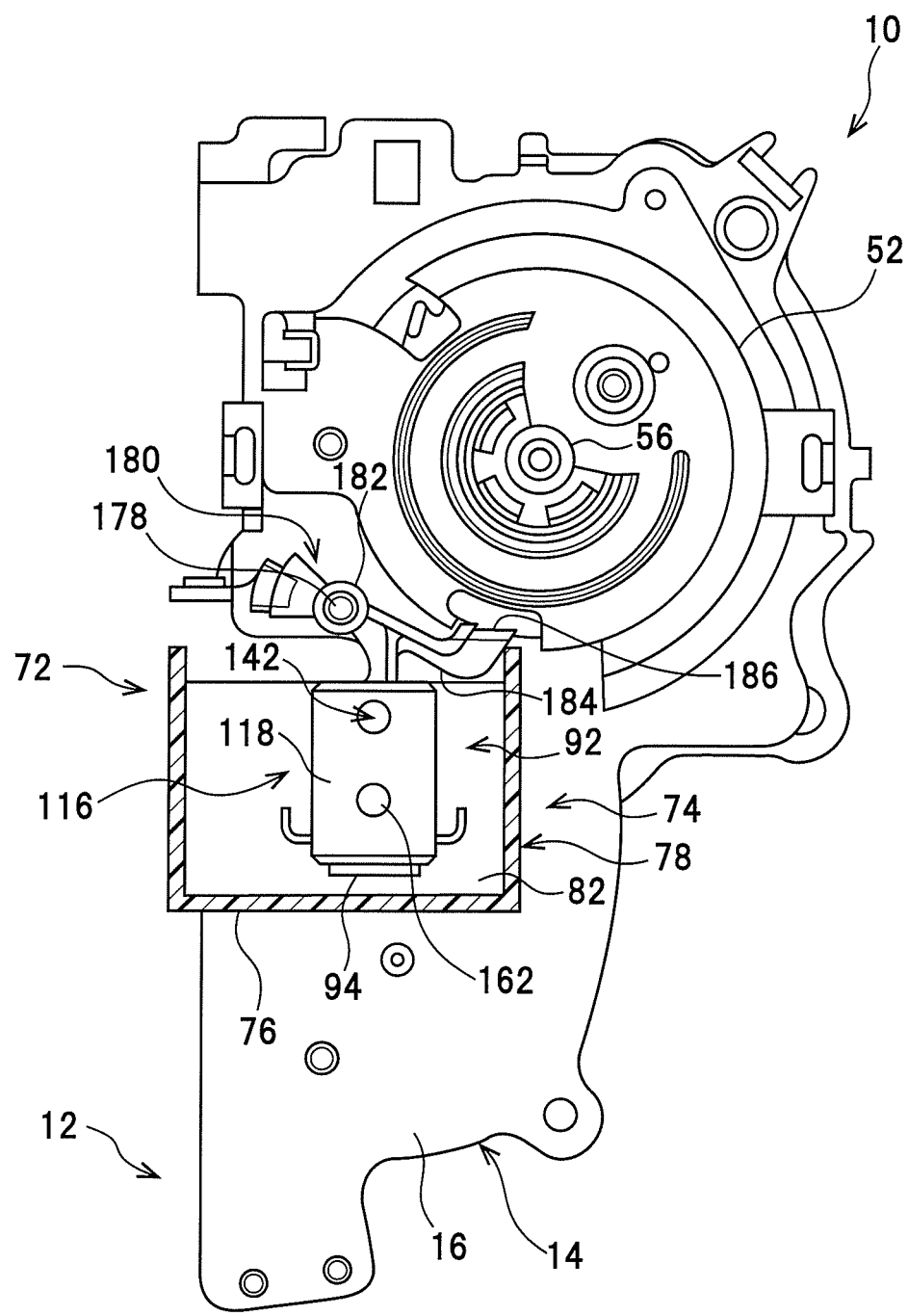
FIG. 5 is a side view illustrating a state prior to tilting of a device main body.
Figure 6:
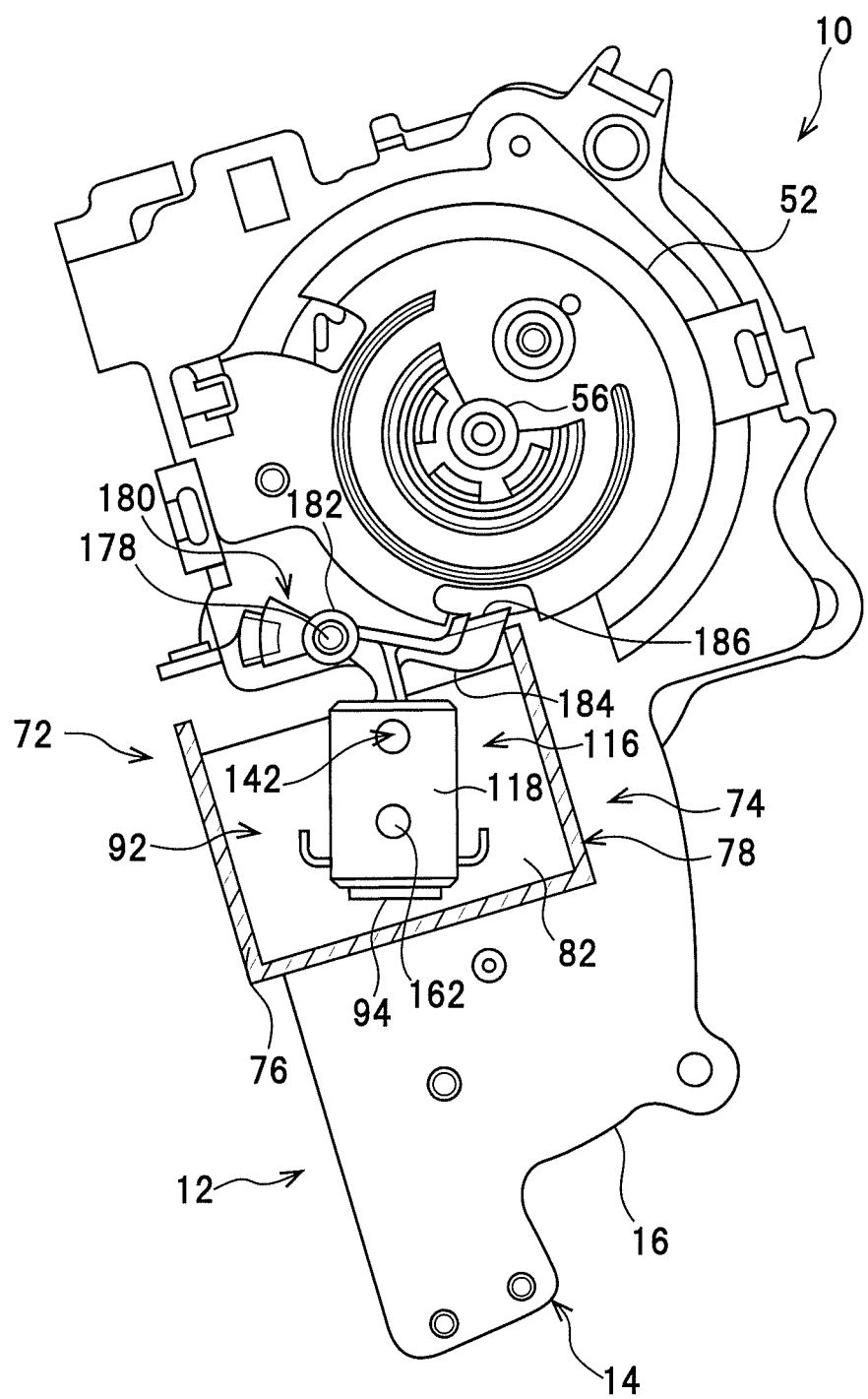
FIG. 6 is a side view illustrating a tilted state of a device main body.

In the webbing take-up device 10, the rotating shafts 142 and 152 of the sensor housing 92 of the acceleration sensor 72 are supported by the support walls 80 and 82 of the hanger 74 so as to be capable of rotating. The device main body 12 of the webbing take-up device 10 tilts together with the seat back, however the sensor housing 92 of the acceleration sensor 72 rotates relative to the hanger 74 (namely the device main body 12) as the sensor housing 92 attempts to maintain the same attitude as the attitude in a state prior to the device main body 12 tilting. Accordingly, even when the device main body 12 tilts, from a state illustrated in FIG. 5, as illustrated in FIG. 6, the attitude (orientation) of the sensor housing 92 of the acceleration sensor 72 does not change, with the opening direction of the placement face 96 being maintained to direct upwards. Accordingly, even when the device main body 12 is tilted, there is no change to the function of the acceleration sensor 72, and as described above, the sensor ball 110 can be made to roll over the placement face 96 even in the event of sudden vehicle deceleration, enabling actuation of the lock mechanism 32.

In the present exemplary embodiment, when the sensor housing 92 of the acceleration sensor 72 attempts to move in a direction moving away from the support wall 82 and approaching the support wall 80 (namely in one vehicle left-right direction), the restriction portion 160 formed at the leading end of the shaft portion 154 contacts the support wall 82 from the opposite side of the support wall 82 to the support wall 80 side, and the abut portion 148 formed at the lower side of the shaft portion 144 contacts the support wall 80. Movement of the sensor housing 92 towards the support wall 80 side is accordingly restricted.

On the other hand, when the sensor housing 92 of the acceleration sensor 72 attempts to move in a direction moving away from the support wall 80 and approaching the support wall 82 (namely in the other vehicle left-right direction), the restriction portion 150 formed at the leading end of the shaft portion 144 contacts the support wall 80 from the opposite side of the support wall 80 to the support wall 82 side, and the abut portion 158 formed at the lower side of the shaft portion 154 contacts the support wall 82. Movement of the sensor housing 92 towards the support wall 82 side is accordingly restricted.

In the webbing take-up device 10, movement of the sensor housing 92 along the facing direction of the vertical wall 114 and the vertical wall 118, namely unintentional movement of the sensor housing 92 in the vehicle left-right direction, can accordingly be restricted.

Note that in the present exemplary embodiment, configuration is made, between the support wall 80 and the support wall 82, with the rotating shafts 142 and 152 that restrict movement of the sensor housing 92, at the portions formed only at the lower sides of the shaft portions 144 and 154. Foreign objects such as dirt and dust that have landed on the upper side of the outer peripheral faces of the circular column shaped shaft portions 144 and 154 accordingly readily slide over the outer peripheral faces of the shaft portions 144 and 154 and fall down, away from the shaft portions 144 and 154. Collection and accumulation of foreign objects such as dirt and dust on the vertical wall 118 side of the shaft portion 144, and on the vertical wall 114 side of the shaft portion 154, can accordingly be prevented or effectively suppressed.

What is claimed is:

1. A webbing take-up device comprising:
    a device main body comprising a spool, the spool taking up a webbing from a base end side thereof in a webbing length direction onto an outer peripheral portion of the spool by rotating in a take-up direction that is one direction about a center axis of the spool;
    an acceleration detection section that includes
        a placement face that is formed in a concave shape that is open upwards,
        a spherical shaped inertia mass body that is placed on the placement face, the inertia mass body rolling on the placement face due to inertia at a time of sudden vehicle deceleration,
        a shaft portion that penetrates a support portion provided at the device main body, and
        an abut portion that is formed only at a lower portion of the shaft portion so as to extend from the lower portion toward a lower side further than a part of the shaft portion which part penetrates the support portion when viewed in a axial direction of the shaft portion and is formed at a lateral side of the support portion in the axial direction, and that restricts movement of the shaft portion along the axial direction by the support portion abutting the abut portion,
    the acceleration detection section rotating about the shaft portion with respect to the device main body accompanying tilting of the device main body such that the acceleration detection section maintains the same orientation as orientation of the acceleration detection section in a state prior to the device main body tilting; and
    a lock section that is actuated by the spool rotating in a pull-out direction that is an opposite direction from the take-up direction in a state in which the inertia mass body of the acceleration detection section rolls on the placement face, rotation of the spool in the pull-out direction being restricted by actuation of the lock section.

2. The webbing take-up device of claim 1, wherein a width dimension of the abut portion is equal to or less than a diameter dimension of the shaft portion, and a shape of the abut portion is set such that the abut portion entirely overlaps with the shaft portion when the shaft portion is seen from a side of the shaft portion which side is opposite to the abut portion.

3. The webbing take-up device of claim 2, wherein the abut portion is formed continuous to the shaft portion.

4. The webbing take-up device of claim 1, wherein the abut portion is formed continuous to the shaft portion.

* * * * *